United States Patent [19]

Wehner et al.

[11] Patent Number: 5,338,419
[45] Date of Patent: Aug. 16, 1994

[54] ELECTRODEPOSITION BATH CONTAINING A URETHANE

[75] Inventors: Susanne Wehner, Villmar, Fed. Rep. of Germany; Heinz Klima, Bad Voeslau, Austria; Michael Hoenel, Wiesbaden, Fed. Rep. of Germany; Peter Ziegler, Mainz, Fed. Rep. of Germany; Gerd Walz, Wiesbaden, Fed. Rep. of Germany

[73] Assignee: Hoechst Aktiengesellschaft, Fed. Rep. of Germany

[21] Appl. No.: 58,933

[22] Filed: May 7, 1993

[30] Foreign Application Priority Data

May 11, 1992 [DE] Fed. Rep. of Germany ....... 4215480

[51] Int. Cl.$^5$ .............................................. C25D 13/10
[52] U.S. Cl. .............................. 204/181.4; 204/181.7; 524/901
[58] Field of Search .................... 204/181.4, 181.7; 524/901

[56] References Cited

U.S. PATENT DOCUMENTS 4,435,559  3/1984  Valko ..................................... 528/45
5,055,542 10/1991  Honel et al. ........................... 528/45
5,202,383  4/1993  Moriarity et al. ................. 204/181.7

FOREIGN PATENT DOCUMENTS 3924694 1/1991 Fed. Rep. of Germany .

Primary Examiner—T. Tung
Assistant Examiner—Kishor Mayekar
Attorney, Agent, or Firm—Bierman and Muserlian

[57] ABSTRACT

An electrodeposition bath comprising a urethane of the formula $$R_1-NHCOO-R_2$$

in which
$R_1$ is alkyl or a group of the formula $$B_1-NH-B_2-[X-B_3]_n-,$$

$R_2$ is a group of the formulae $-(C_2H_4O)_y-R_1$, $-(C_3H_7O)_y-R$ or of the formula $$-CH-C-A-R_3,$$
with $R_4$, $R_5$ substituents and $OH$ R is $C_1-C_{18}$-alkyl,
Y is a number from zero to 4,
$B_1$ is hydrogen, alkyl or a group of the formula $$-COOR_2,$$

$B_2$ and $B_3$ may be identical or different and are $C_2-C_{14}$-alkylene,
n is an integer from 0 to 5,
X is $-O-$, $-S-$, $-NH-$ or $>N-(C_1-C_4)$ alkyl,
$R_3$ is hydrogen, alkyl, alkenyl, hydroxyalkyl, phenyl or alkylphenyl,
$R_4$ and $R_5$ may be identical or different and are hydrogen or $C_1-C_4$-alkyl and
A is a direct bond or one of the groups $-O-$, $-CH_2O-$ or $-CH_2OCO-$.

The inclusion of these urethanes in the electrodeposition bath brings about a reduction in the number of surface defects on galvanized surfaces.

8 Claims, No Drawings

ELECTRODEPOSITION BATH CONTAINING A URETHANE

BACKGROUND OF THE INVENTION

The priming of metal parts, especially automobile bodies, is carried out nowadays largely by an electrodeposition method, predominantly in the form of a cationic electrodeposition (CED). In this method the substrate is immersed in an aqueous CED bath and connected as the cathode. By applying direct current the binder is then deposited from the bath onto the substrate. The deposited binder is then cured by storing or other methods. Suitable binders for such CED baths are in particular those containing amino groups. Using acid, these amino groups are converted to ammonium salts and the binders then become soluble or dispersible in water. However, especially when producing relatively thick coats on galvanized substrates, defects often occur in the stoved film. It is the object of the present invention to avoid or to reduce these defects.

SUMMARY OF THE INVENTION

In accordance with the invention this object is achieved by the electrode deposition bath, especially a CED bath, comprising a urethane of the formula $$R_1\text{—NHCOO—}R_2$$

in which $R_1$ is $C_4$-$C_{22}$-alkyl, preferably $C_{10}$-$C_{15}$-alkyl or a group of the formula

$R_2$ is a group of the formulae —$(C_2H_4O)_y$-$R_1$, -$(C_3H_7O)_y$-R or of the formula

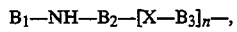

R is $C_1$-$C_{18}$-alkyl,

Y is a number from zero to 4, $B_1$ is hydrogen, $C_1$-$C_{18}$-alkyl or a group of the formula $$\text{—COOR}_2,$$

$B_2$ and $B_3$ may be identical or different and are $C_2$-$C_{14}$-alkylene n is an integer from 0 to 5, preferably from 0 to 2, X is —O—, —S—, —NH— or >N—($C_1$—$C_4$) alkyl, $R_3$ is hydrogen, $C_1$-$C_{18}$-alkyl, $C_1$-$C_{10}$-hydroxyalkyl, phenyl, $C_1$-$C_{18}$-alkylphenyl or $C_2$-$C_{10}$-alkenyl, $R_4$ and $R_5$ may be identical or different and are hydrogen or $C_1$-$C_4$-alkyl and A is a direct bond or one of the groups —O—, —CH$_2$O— or —CH$_2$OCO—.

The urethanes to be used in accordance with the invention are preferably those urethanes of the formula given above in which $R_1$ is the group of the formula $B_1$—NH—$B_2$—(X—$B_3$)$_n$—, which have molecular mass values (number average) of about 160-1500, preferably from 250-1000, and viscosities from 300 mPa. s to 3000 mPa. s.

These urethanes are obtained by processes known per se. The urethanes in which $R_2$ is alkyl are obtained by reacting isocyanates of the formula $R_1$—NCO with alcohols of the formula $R_2$—OH. In the case where $R_2$ is a group of the formula

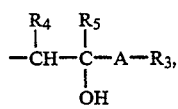

the urethanes are prepared by reacting an amine of the formula $R_1$—NH$_2$ with a 2—oxo—1,3—dioxolane of the formula

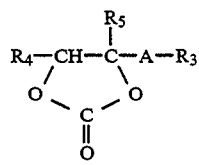

In the reaction of one mole of di- or polyamines of the formula $H_2N$—$B_2$—[X—$B_3$]$n$—NH$_2$ with at least two moles of a 2-oxo-1,3-dioxolane of the above formula those urethanes of the formula given earlier are obtained, in an analogous manner, in which $R_1$ is a group of the formula $B_1$—NH—$B_2$—[X—$B_3$]$n$—, $B_1$ is a group of the formula —COOR$_2$ and the two groups $R_2$ are a radical of the formula

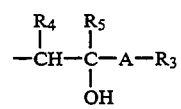

Examples of the primary monoamines which are suitable starting compounds are n-butylamine, n-octylamine, tridecylamine, isotridecylamine, 3-methoxypropylamine, 3(2-ethylhexyloxy)propylamine, cyclohexylamine, benzylamine, 2-phenylethylamine and 2-methoxyphenylethylamine.

Examples of diprimary amines of the formula $H_2N$—$B_2$—[X—$B_3$]$n$—NH$_2$ are diethylenetriamine and higher homologs such as triethylenetetramine, hexamethylenediamine, 2-methylpentamethylenediamine and bishexamethylenetriamine.

Examples of cyclic monocarbonates which can be reacted with the amines to form a urethane linkage are ethylene carbonate, propylene carbonate, dodecane carbonate or monocarbonates prepared by reacting monoepoxides with $CO_2$. Examples of such monoepoxides are glycidyl esters of aliphatic or aromatic, saturated or unsaturated monocarboxylic acids: acrylic acid, methacrylic acid, benzoic acid, etc. A very common commercially available glycidyl ester is that of a mixture of saturated monocarboxylic acids having a chain length of 9 to 11 carbon atoms, predominantly (approximately 94%) comprising tertiary acids (Versatic acid glycidyl ester). Also suitable are monoglycidyl ethers of monohydric phenols, for example of phenol, or of alkylphenols having 1 to 18, preferably 1 to 12, carbon atoms in the alkyl radical, and of alkane diols such as ethylene glycol, propylene glycol, neopentyl glycol and 1,6-hexanediol.

To prepare the urethanes according to the invention, the cyclic monocarbonates are placed in a vessel and heated to from 60° to 120° C., preferably from 70° to 90° C. The amine is metered in slowly, over a period of 2 hours. The ratio of monocarbonate to primary amine is from 0.8–1.2:1, preferably from 1.0–1.1:1.

With the inclusion of these urethanes, the coatings obtained on galvanized surfaces show little or no sign of surface defects, since a lower voltage can be applied to achieve the intended film thickness, due to better film-forming properties, and surface defects on galvanized substrates occur only at higher voltages if at all, and then to a reduced extent.

The electrodeposition baths according to the invention comprise all the conventional binders, crosslinking agents, pigments, catalysts and additives. Examples of suitable binders are cationic amine-modified epoxy resins, which may be autocrosslinking but are preferably externally crosslinking. The term cationic amine-modified epoxy resins is understood to refer to cationic reaction products of (A) modified or unmodified polyepoxides, (B) primary and/or secondary amines or their salts and/or salts of tertiary amines, and if appropriate (C) polyols, polycarboxylic acids, polyamines or poly-sulfides.

However, binders which are suitable and preferred are cationic amino-urethane resins, as described in EP-A 0 274 721, EP-A 0 272 665 and EP-A 234 395.

Where these binders are not autocrosslinking, suitable crosslinking agents are phenolic resins, polyfunctional Mannich bases, melamine resins, benzoguanamine resins or blocked polyisocyanates.

The urethanes described at the outset can be introduced into the electrodeposition bath in a variety of ways, for example by adding the urethane to the solution of the binder in an organic solvent or via the pigment paste.

The production of pigment pastes is general knowledge (cf. D.H. Parker, Principles of Surface Coating Technology, Interscience Publishers, New York (1965); R.L. Yates, Electropainting, Robert Draper Ltd., Teddington, England (1966); H.F. Payne, Organic Coating Technology, Volume 2, Wiley and Sons, New York (1961)). The pigment pastes may in principle contain all pigments suitable for electrodeposition coatings. In general titanium dioxide is the sole or predominant white pigment. However, other white pigments or extenders, such as antimony oxide, zinc oxide, basic lead carbonate, basic lead sulfate, barium carbonate, porcelain, clay, calcium carbonate, aluminum silicate, silicon dioxide, magnesium carbonate and magnesium silicate can also be used.

Examples of color pigments which can be used are cadmium yellow, cadmium red, carbon black, phthalocyanine blue, chromium yellow, toluidyl red and hydrated iron oxide.

In addition to the pigments, the pigment paste can also contain plasticizers, fillers, wetting agents and the like.

The pigment paste is added to the aqueous dispersion of the cathodically depositable synthetic resin in an amount such that the finished electrodeposition bath has the properties necessary for the deposition. In most cases the weight ratio between the pigment and the cathodically depositable synthetic resin is 0.05 to 0.7.

The urethane is preferably added to the finished electrodeposition bath either in the form of a solution in an organic solvent or, preferably, in the form of a so-called correcting dispersion.

The correcting dispersion is obtained by adding to the urethane a water-emulsifiable or water-dispersible auxiliary which is ionic or nonionic in nature (termed emulsifier hereinafter). Examples of such emulsifiers are polyoxyalkyleneamines, such as, for example, Jeffamin ® from DEA, polyethylene glycols, ethylene oxide-grafted alkylphenols, Sapogenate ®, Arkopale ® (both from Hoechst) or Triton ® (Rohm & Haas). Further suitable emulsifiers are quaternized epoxide- or carbonate-amine adducts as described in EP-A 0 352 677 or EP-A 0 350 618 or EP-A 0 107 089 or EP-A 0 107 088, and epoxide- or carbonate-amine adducts which after protonation are emulsifiable in water or solubilizable, as described for example in EP-A 0 000 086 or EP-A 0 395 122, or reaction products of polyalkylene glycols with polyglycidyl ethers of polyhydric phenols as in EP-A 0 081 163.

The abovementioned emulsifiers may be added to the urethane or to a preparation containing this urethane in amounts of 1 to 25% (solid/solid), preferably 3 to 15% (solid/solid).

The urethanes employed in accordance with the invention are incorporated in the electrodeposition baths in amounts such that the final coating baths contain preferably 0.01–5.0%, particularly preferably 0.05–1.0% and very particularly preferably 0.1–0.3%.

It is self-evident that mixtures of different urethanes can also be employed.

The electrodeposition baths according to the invention may comprise, in addition to the cathodically depositable synthetic resin, the pigment paste and the urethane, other conventional additives, such as auxiliary solvents, antioxidants, surface-active agents and the like.

The solids content of the electrodeposition baths according to the invention is preferably 7 to 35 parts by weight, particularly preferably 12 to 25 parts by weight. The pH of the electrodeposition baths is between 4 and 8, preferably between 5 and 7.5.

The electrodeposition baths according to the invention can be used for coating any desired electrically conducting substrates, but in particular for coating metals such as steel, aluminum, copper and the like. The steel may be galvanized, phosphatized, unphosphatized or pretreated in any other manner known to one skilled in the art.

The invention also relates to a method of coating electrically conductive substrates, in which the substrate is immersed in an aqueous electrodeposition bath containing at least one cathodically depositable synthetic resin, the substrate is connected as the cathode, a film is deposited on the substrate by direct current, the substrate is removed from the electrodeposition bath and the coating film deposited is stoved.

A characteristic feature of the method is that the aqueous electrodeposition bath comprises a urethane as defined at the outset.

The electrodeposition bath is brought into contact with an electrically conducting anode and with the electrically conductive substrate connected as the cathode. The passage of electric current between anode and cathode causes a firmly adhering coating film to be deposited on the cathode.

The temperature of the electrodeposition bath should be between 15° and 40 ° C., preferably between 25°and 35 ° C.

The voltage applied can vary within a wide range and may for example be between 2 and 1000 volts. Typically, however, voltages of between 50 and 500 volts are applied. The current density is in general between about 10 and 3000 amperes/m². In the course of the deposition the current density drops.

After the deposition, the coated article is rinsed and is ready for stoving.

The deposited coating films are generally stoved at temperatures of 130° to 200° C. for a period of 10 to 60 minutes, preferably at 150° to 180° C. for a period of 15 to 30 minutes.

The invention is illustrated in more detail in the following examples. All tables in parts and percentages are by weight unless expressly stated otherwise.

1. PREPARATION OF AN AQUEOUS BINDER DISPERSION

1.1. In analogy to EP-A 0 000 086, Example 31, an epoxide-amine adduct was prepared as follows:

210 parts of diethanolamine, 102 parts of N,N-dimethylaminopropylamine and 636 parts of an adduct of 1 tool of 2-methylpentamethylenediamine and 2 tool of Versatic acid glycidyl ester (Cardura ® E10 from Shell) are added to 3400 parts of bisphenol A epoxy resin (equivalent weight about 480) in 2.341 parts of methoxy-2-propanol (about 65% strength). The reaction mixture was held for 4 hours with stirring at 60° to 90° C. and then for one hour at 120° C.

Hydroxyl number: approximately 155 mg of KOH/g of solid resin

Amine number: approximately 77 mg of KOH/g of solid resin

1.2. Preparation of the (partially) blocked polyisocyanates 1.2.1. 124 parts (1.05 mol) of butylglycol and 0.3 parts of dibutyltin laurate (DBTL) are run in over 60–120 min to 174 parts of Desmodur ® T80 (80% 2,4- and 20% 2,6-tolylene diisocyanate; approximately 1 tool) at 40°–60° C. and the mixture is then held at this temperature up to a % NCO value of about 12.8-13.5.

1.2.2. 42.4 parts of trimethylolpropane are introduced in portions to 298 parts of the compound 1.2.1. in 146 parts of toluene and reacted at 80° C. up to a %NCO value of practically 0 ( about 70% strength, 51% TDI ).

1.3. Preparation of the binder dispersion [A]parts (see Table 1 below) of binder solution (1.1.) are mixed with [B] parts of curing agent solution (1.2.2.), 5 parts of Texanol, 1.5 parts of 2-ethylhexanol and 2.3 parts of 50% strength aqueous formic acid (25 meq) and concentrated under vacuum (up to 20 mbar) at temperatures of up to 80° C. to approximately 90% solids. Subsequently, using 139 parts of deionized water and stirring thoroughly, the two 40% strength dispersions below are prepared:

TABLE 1

| Binder dispersion | [A] Parts | [B] | $d_n$* (nm) | $d_w$* (nm) | % TDI/ binder |
|---|---|---|---|---|---|
| 1.4. | 123.7 | 28.0 | 240 | 560 | 10.0 |
| 1.5. | 120.6 | 32.7 | 216 | 500 | 12 |

*average particle diameter (number average: $d_n$, weight average: $d_w$), determined by dynamic light scattering.

2. PREPARATION OF A PIGMENT PASTE (in analogy to EP-A 0 352 677 Example I.3. )

2.1. Preparation of a paste resin 2.1.1. 1708 parts (4 mol) of Denacol ® EX-145 (phenol-(5 EO)-glycidyl ether) are run in over one hour to a solution of 204 parts (2 mol) of N,N-dimethylaminopropyl-amine in 1224 parts of ethoxypropanol at 60°–80° C. and the mixture is then held at 80°–100° C. until an epoxy number of practically 0 is reached (amine number approximately 117 mg of KOH/g of solids; about 60% strength).

72 parts of deionized water and 400 parts of lactic acid (90% strength) are run in to the solution with cooling and the mixture is then diluted to 60% with 128 parts of butylglycol.

2.1.2. 1280 parts (2 equivalents of epoxide) of Beckopcx ® SEP311 (75% in xylene) are heated to 80° C. 1184 parts of the urethane (2.1.4., 75%) are run in to this solution over one hour and the mixture is held at 80° C. until the % NCO value is practically 0. The solvent is then removed under vacuum and the batch is diluted to about 60% with 1232 parts of ethoxypropanol.

2.1.3. ( 2.1.1. ) is introduced into the solution obtained under (2.1.2) and the mixture is held at 60°–80° C. until an acid value and epoxide number of practically 0 are reached. The paste resin is diluted to 55% with butylglycol.

2.1.4. 540 parts of isooctadecyl alcohol and 0.9 parts of DBTL are run in over one hour to 348 parts of Desmodur ® T80 (80% 2,4- and 20% 2,6-tolylene diisocyanate) in 296 parts of xylene at 40°–60° C. and the mixture is then held at this temperature up to a %NCO value of about 9.5 (about 75% strength).

2.2. Preparation of the urethane 2.2.1. 305 parts of the carbonate based on Cardura ® E10 (Shell) are placed in a vessel and heated to 80° C. 185 parts of dodecylamine (Hoechst AG) are metered in slowly over two hours at a rate such that the temperature does not exceed 90° C. When addition is complete the mixture is held at 80° C. and put to reaction until an amine number of <10 (mg of KOH/g) is obtained.

About 100% solids (1 h, 125° C., DIN 53 216); about 1700 mPa.s/T =23° C.

2.2.2. 610 parts of Cardura ® E10 carbonate are placed in a vessel and heated to 80° C. 215 parts of bishexamethylene trimmine (Rhone Poulenc) are metered in slowly over two hours at a rate such that a temperature of 90° C. is not exceeded. When addition is complete, the mixture is held at 80° C. and brought to reaction until an amine number of <68 is reached.

Approximately 100% solids (1 h, 125° C., DIN 53 216 ); about 340 mPa.s/T =23° C.

2.2.3. 102 parts of propylene carbonate are placed in a vessel and heated to 80° C. 199 parts of tridecylamine are metered in slowly over two hours at a rate such that a temperature of 90° C. is not exceeded. When addition is complete, the mixture is held at 80° C. and brought to reaction until an amine number of <10 is reached.

Approximately 100% solids (1 h, 125° C., DIN 53 216); about 1200 mPa.s/T =23° C.

2.3. Preparation of the pigment paste 2.3.1. In analogy to DE 39 40 781 a catalyst paste containing dibutyltin oxide is prepared (see Example 5).

2.3.2. 8.8 parts of binder as in 2.1.3., 1.8 parts of urethane as in 2.2.1., 0.6 part of acetic acid (50% strength), 0.6 part of 2,4,7,9-tetramethyl-5-decyne-4,7-diol (Surfynol 104 ®, wetting agent) and 12.3 parts of a paste as in 2.3.1. are mixed with one another. With stirring, 4.0 parts of lead silicate, 0.4 part of carbon black and 40.2 parts of titanium dioxide are added thereto. A suitable viscosity is established using 31.3 parts of deionized water and the pigment paste is milled in an appropriate mill to a sufficient particle size.

2.3.3.2.3.2. is repeated with the proviso that, instead of 1.8 parts of urethane as in 2.2.1., 1.8 parts of urethane as in 2.2.2. are employed.

2.3.4.2.3.2. is repeated with the proviso that, instead of 1.8 parts of urethane as in 2.2.1., 1.8 parts of urethane as in 2.2.3. are employed.

2.3.4.2.3.2. is repeated but 10.6 parts of the binder as in 2.1.3. are employed without the urethane as in 2.2.1.

3. COATING FORMULATION 300 parts of binder dispersion (40%) as in Examples 1.4. and 1.5. are diluted with 180 parts of deionized water to approximately 25% solids, with stirring. To this clearcoat solution are added 109 parts of pigment paste as in 2.3.2.; 2.3.3.; 2.3.4. and 2.3.5. and 1.2 parts of 50% strength formic acid. The solids content is then adjusted to about 18% using deionized water; pigment-/binder ratio (PBR) approximately 0.4: 1.

4. DEPOSITION/DEPOSITION RESULTS

The coating preparations are subjected to cataphoretic deposition in an open glass vessel. The cathode comprises galvanized substrates and the anode, at a distance of 5 to 10 cm from the cathode, bright-annealed steel plate. The bath temperature is 32° C. and the duration of deposition is 2 minutes. Stirring is effected using a Teflon-coated magnetic stirrer rod.

TABLE 2

| Dispersion as in | Paste as in | Electrodeposition bath |
|---|---|---|
| 1.4. | 2.3.2. | 1 |
| 1.4. | 2.3.3. | 2 |
| 1.4. | 2.3.4. | 3 |
| 1.4. | 2.3.5. | 4 |
| 1.5. | 2.3.2. | 5 |
| 1.5. | 2.3.3. | 6 |
| 1.5. | 2.3.4. | 7 |
| 1.5. | 2.3.5. | 8 |

The voltages applied, the film thicknesses obtained and the properties of each of the deposited and subsequently cured films (storing conditions 20 min at an oven temperature of 170° C.) are given in Tables 3 and 4 below:

TABLE 3

Using hot-galvanized steel plates (Rb24/NL60)

| Voltage (V) | Film thickness (μm) Electrodeposition bath No. | | | | | | | |
|---|---|---|---|---|---|---|---|---|
| | 1 | 2 | 3 | 4 | 5 | 6 | 7 | 8 |
| 200 | 13 | 13 | 13.5 | 12.5 | 13 | 13 | 13 | 12 |
| 225 | 15 | 15 | 17 | 14.5 | 15.5 | 16 | 16 | 14 |
| 250 | 18 | 17 | 18 | 16 | 18.5 | 18 | 17.5 | 15 |
| 275 | 20 | 19 | 19 | 17.5(S) | 20 | 22 | 21 | 17(S) |
| 300 | 25(S) | 24(S) | 23.5(S) | | 24(S) | | 24(S) | 24(S) |
| 325 | | | | | | | | |

S = surface defects

TABLE 4

Using electrolytically galvanized steel plates (Rb26/NL60)

| Voltage (V) | Film thickness (μm) Electrodeposition bath No. | | | | | | | |
|---|---|---|---|---|---|---|---|---|
| | 1 | 2 | 3 | 4 | 5 | 6 | 7 | 8 |
| 200 | 19.5 | 17 | 18 | 14 | 17 | 18 | 16.5 | 14.5 |
| 225 | 24 | 23 | 24 | 18 | 19 | 19.5 | 19 | 17 |
| 250 | 29 | 28 | 28.5 | 24 | 26 | 24 | 25 | 23 |
| 275 | 34 | 33 | 34 | 28(S) | 32 | 26 | 27 | 26(S) |
| 300 | 39(S) | 37(S) | 39(S) | 35(S) | 34(S) | | 36(S) | |
| 325 | | | | | | | | |

5. PREPARATION OF AN AQUEOUS BINDER DISPERSION 5.1. as described under 1.4.

5.2. as described under 1.5.

5.3. as 1.4. with the difference that 1.7 parts of the urethane as in 2.2.1. are added to the binder solution 1.1. and curing agent solution 1.2.2.

5.4. as 1.4. with the difference that 1.7 parts of the urethane as in 2.2.2. are added to the binder solution 1.1. and curing agent solution 1.2.2.

5.5. as 1.4. with the difference that 1.7 parts of the urethane as in 2.2.3. are added to the binder solution 1.1. and curing agent solution 1.2.2.

5.6. as 1.5. with the difference that 1.7 parts of the urethane as in 2.2.1. are added to the binder solution 1.1. and curing agent solution 1.2.2.

5.7. as 1.5. with the difference that 1.7 parts of the urethane as in 2.2.2. are added to the binder solution 1.1. and curing agent solution 1.2.2.

5.8. as 1.5. with the difference that 1.7 parts of the urethane as in 2.2.3. are added to the binder solution 1.1. and curing agent solution 1.2.2.

6. PREPARATION OF A PIGMENT PASTE

As described in 2.3.5.

7. COATING FORMULATION 300 parts of binder dispersion (40%) as in Examples 5.1., 5.2., 5.3., 5.4., 5.5., 5.6., 5.7. and 5.8. are diluted to about 25% solids with 180 parts of deionized water, with stirring. To this clearcoat solution are added 109 parts of pigment paste as in 6. and 1.2 parts of 50% strength formic acid. The solids content is then adjusted to about 18% using deionized water; PBR approximately 0.4:1.

8. DEPOSITION/DEPOSITION RESULTS

Deposition is effected as described under 4.

TABLE 5

| Dispersion as in | Paste analogous to | Electrodeposition bath |
|---|---|---|
| 5.1. | 6 | 9 |
| 5.2. | 6 | 10 |
| 5.3. | 6 | 11 |
| 5.4. | 6 | 12 |
| 5.5. | 6 | 13 |
| 5.6. | 6 | 14 |
| 5.7. | 6 | 15 |
| 5.8. | 6 | 16 |

TABLE 6

Using hot-galvanized steel plates (Rb24/NL60)

| Voltage (V) | Film thickness (μm) Electrodeposition bath No. | | | | | | | |
|---|---|---|---|---|---|---|---|---|
| | 9 | 10 | 11 | 12 | 13 | 14 | 15 | 16 |
| 200 | 12.5 | 12 | 13.5 | 13 | 13 | 13 | 13 | 13 |
| 225 | 14.5 | 14 | 17 | 15 | 16 | 16 | 16 | 16.5 |
| 250 | 16 | 15 | 18 | 18 | 17 | 17.5 | 17 | 18 |
| 275 | 17.5(S) | 17(S) | 19 | 20 | 19.5 | 21 | 21 | 21 |
| 300 | | | 20.5(S) | 25 | 23(S) | 24(S) | 23(S) | 24(S) |

TABLE 6-continued

Using hot-galvanized steel plates (Rb24/NL60)

| Voltage (V) | Film thickness (μm) Electrodeposition bath No. | | | | | | | |
|---|---|---|---|---|---|---|---|---|
| | 9 | 10 | 11 | 12 | 13 | 14 | 15 | 16 |
| 325 | | | | | | | | |

Table 7

Using electrolytically galvanized steel plates (Rb26/NL60)

| Voltage (V) | Film thickness (μm) Electrodeposition bath No. | | | | | | | |
|---|---|---|---|---|---|---|---|---|
| | 9 | 10 | 11 | 12 | 13 | 14 | 15 | 16 |
| 200 | 14 | 14.5 | 19 | 17 | 18 | 16.5 | 16 | 16 |
| 225 | 18 | 17 | 23 | 23 | 23.5 | 18 | 18.5 | 18 |
| 250 | 2 | 23 | 28 | 27 | 27.5 | 20.5 | 20.5 | 20 |
| 275 | 28(S) | 26(S) | 34 | 32 | 33 | 27 | 25 | 23(S) |
| 300 | | | 38(S) | 36(S) | 35(S) | 36(S) | 34(S) | 32(S) |
| 325 | | | | | | | | |

9. PREPARATION OF AN AQUEOUS BINDER DISPERSION 9.1. in analogy to 1.4.
9.2. in analogy to 1.5.

10. PREPARATION OF A PIGMENT PASTE

As described under 2.3.5.

11. PREPARATION OF THE ADDITION SUBSTANCE 11.1. The urethane 2.2.1. is mixed 1:1 with butylglycol.
11.2. The urethane 2.2.2. is mixed 1:1 with butylglycol.
11.3. The urethane 2.2.3. is mixed 1:1 with butylglycol.

12. COATING FORMULATION 300 parts of binder dispersion (40%) as in Examples 9.1. and 9.2. are diluted to about 25% solids using 180 parts of deionized water, with stirring. To this clearcoat solution are added 109 parts of pigment paste as in 10. and 1.2 parts of 50% strength formic acid. The solids content is then adjusted to about 18% using deionized water and 4 parts of the addition substance as in 11.1., 11.2. and 11.3. are added (stirred in for at least one hour); PBR about 0.4:1.

13. DEPOSITION/DEPOSITION RESULTS

Deposition is effected as described under 4.

TABLE 8

| Dispersion as in | Paste analogous to | Addition substance | Electro-deposition bath |
|---|---|---|---|
| 9.1. | 10 | — | 17 |
| 9.1. | 10 | 11.1. | 18 |
| 9.1. | 10 | 11.2. | 19 |
| 9.1. | 10 | 11.3. | 20 |
| 9.2. | 10 | — | 21 |
| 9.2. | 10 | 11.1. | 22 |
| 9.2. | 10 | 11.2. | 23 |
| 9.2. | 10 | 11.3. | 24 |

TABLE 9

Using hot-galvanized steel plates (Rb24/NL60)

| Voltage (V) | Film thickness (μm) Electrodeposition bath No. | | | | | | | |
|---|---|---|---|---|---|---|---|---|
| | 17 | 18 | 19 | 20 | 21 | 22 | 23 | 24 |
| 200 | 14.5 | 15 | 16 | 15 | 14 | 16 | 16.5 | 16 |
| 225 | 16 | 18 | 18 | 17 | 15 | 19 | 19 | 19.5 |
| 250 | 18 | 21 | 21 | 19 | 17 | 22 | 22.5 | 23 |
| 275 | 20.5(S) | 24 | 24 | 22 | 19(S) | 25 | 28 | 27 |
| 300 | | 27(S) | 27(S) | 25(S) | | 27(S) | 29(S) | 29(S) |
| 325 | | | | | | | | |

TABLE 10

Using electrolytically galvanized steel plates Bo26G

| Voltage (V) | Film thickness (μm) Electrodeposition bath No. | | | | | | | |
|---|---|---|---|---|---|---|---|---|
| | 17 | 18 | 19 | 20 | 21 | 22 | 23 | 24 |
| 200 | 14 | 20.5 | 19 | 19.5 | 13.5 | 19.5 | 19.5 | 20 |
| 225 | 18 | 26 | 24 | 25 | 20 | 25 | 22 | 25 |
| 250 | 24 | 31.5 | 31 | 31 | 26 | 30 | 28 | 32 |
| 275 | 28(S) | 39 | 37 | 38 | 30(S) | 35 | 35 | 38 |
| 300 | | 44(S) | 42(S) | 42(S) | | 40(S) | 38(S) | 43(S) |

14. PREPARATION OF AN AQUEOUS BINDER DISPERSION 14.1. in analogy to 1.4.
14.2. in analogy to 1.5.

15. PREPARATION OF A PIGMENT PASTE

As described under 2.3.5.

16. PREPARATION OF AN EMULSIFIER (DISPERSANT)

4000 parts of PEG4000 (about 1 mol, polyethylene glycol having an average molecular mass of about 4000, Hoechst AG) are dewatered in circulation with 971 parts of toluene at 130°–140° C.

The solvent is then removed under vacuum at 100°–120° C. and 5.2 parts of HBF4 (50% in water) are added. While stirring this solution thoroughly, 421 parts of Beckopox ® EP140 (about 1.15 mol, diglycidyl ether of bisphenol A, EV183, from Hoechst AG) are run in slowly at 100°–130° C. and the mixture is held at this temperature up to an EV of about 10,000.

17. PREPARATION OF A CORRECTING DISPERSION 17.1. A mixture of 148 parts of the urethane as in 2.2.1. and 15 parts of the emulsifier 16 is dispersed with 97 parts of deionized water. Dispersion is carried out using a stirrer device, for example a high-speed stirrer (dissolver). Then 740 parts of the binder dispersion as in 14.1. are added with stirring.

17.2. as in 17.1. with the proviso that, instead of the urethane 2.2.1., the urethane 2.2.2. is employed.

17.3. as in 17.1. with the proviso that, instead of the urethane 2.2.1., the urethane 2.2.3. is employed.

17.4. as in 17.1. with the proviso that, instead of the binder dispersion 14.1., the binder dispersion 14.2. is employed.

17.5. as in 17.2. with the proviso that, instead of the binder dispersion 14.1., the binder dispersion 14.2. is employed.

17.6. as in 17.3. with the proviso that, instead of the binder dispersion 14.1., the binder dispersion 14.2. is employed.

18. COATING FORMULATION 290 parts of binder dispersion (40%) as in Examples 14.1. and 14.2. are diluted to about 25% solids using 180 parts of deionized water, with stirring. To this clearcoat solution are added 109 parts of pigment paste as in 15. and 1.2 parts of 50% strength formic acid. The correcting dispersion as in 17.1., 17.2., 17.3., 17.4., 17.5 and 17.6. is then added and the solids content is adjusted to about 18% using deionized water; PBR 0.4:1.

19. DEPOSITION/DEPOSITION RESULTS

Deposition is effected as described under 4.

TABLE 11

| Dispersion as in | Paste analogous to | Correcting Electro-dispersion deposition bath as in | |
|---|---|---|---|
| 14.1. | 15 | — | 25 |
| 14.1. | 15 | 17.1. | 26 |
| 14.1. | 15 | 17.2. | 27 |
| 14.1. | 15 | 17.3. | 28 |
| 14.2. | 15 | — | 29 |
| 14.2. | 15 | 17.4. | 30 |
| 14.2. | 15 | 17.5. | 31 |
| 14.2. | 15 | 17.6. | 32 |

TABLE 12

Using hot-galvanized steel plates (Rb24/NL60)

| Voltage (V) | Film thickness (μm) Electrodeposition bath No. | | | | | | | |
|---|---|---|---|---|---|---|---|---|
| | 25 | 26 | 27 | 28 | 29 | 30 | 31 | 32 |
| 200 | 12.5 | 13.5 | 14 | 14 | 12 | 13.5 | 13 | 13 |
| 225 | 14.5 | 17 | 15.5 | 17 | .14 | 18 | 15 | 15 |
| 250 | 16 | 18 | 17 | 19 | 15 | 19 | 16 | 17 |
| 275 | 17.5(S) | 19 | 19 | 22 | 17(S) | 20 | 21 | 19 |
| 300 | | 20.5(S) | 24(S) | 24(S) | | 24(S) | 24(S) | 23(S) |
| 325 | | | | | | | | |

S = surface defects

TABLE 13

Using electrolytically galvanized steel plates (Rb26/NL60)

| Voltage (V) | Film thickness (μm) Electrodeposition bath No. | | | | | | | |
|---|---|---|---|---|---|---|---|---|
| | 25 | 26 | 27 | 28 | 29 | 30 | 31 | 32 |
| 200 | 14 | 17 | 18 | 17 | 14.5 | 16 | 16.5 | 14.5 |
| 225 | 18 | 23 | 24 | 23 | 17 | 18.5 | 18 | 16 |
| 250 | 24 | 27 | 29 | 28 | 23 | 21 | 20.5 | 18 |
| 275 | 28(S) | 32 | 34 | 33 | 26(S) | 25 | 27 | 23 |
| 300 | | 36(S) | 38(S) | 37(S) | | 34(S) | 36(S) | 32(S) |
| 325 | | | | | | | | |

What we claim is:

1. An electrodeposition liquid composition containing an electrophoretically depositable binder, a curing agent, and 0.01 to 5 per cent by weight of a monofunctional urethane of the formula $$R_1\text{—NHCOO—}R_2$$

in which $R_1$ is $C_4$-$C_{22}$-alkyl or $B_1$-NH-$B_2$-[X-$B_3$]$_n$-, wherein
   $B_1$ is selected from the group consisting of hydrogen, $C_1$-$C_{18}$-alkyl and —COOR$_2$,
   $B_2$ and $B_3$ are individually $C_2$-$C_{14}$-alkylene,
   X is selected from the group consisting of —O—, —S—, —NH— and >N-($C_1$-$C_4$)-alkyl,
   $R_2$ is selected from the group consisting of —($C_2H_4O$)$_y$—$R_1$, —($C_3H_7O$)$_y$—R, and

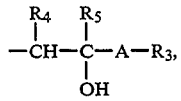

n is an integer from 0 to 5
   R is $C_1$-$C_{18}$-alkyl,
   $R_3$ is selected from the group consisting of hydrogen, $C_1$-$C_{18}$-alkyl, hydroxyalkyl, phenyl, $C_1$-$C_4$-alkylphenyl and $C_2$-$C_{10}$-alkenyl,
   $R_4$ and $R_5$ are individually hydrogen or $C_1$-$C_4$-alkyl and
   A is a chemical bond or a divalent group selected from the group consisting of —O—, —CH$_2$O— and —CH$_2$OCO—
   y is zero or an integer from 1 to 4.

2. The liquid composition of claim 1, wherein in the monofunctional urethane, $R_1$ is $C_4$-$C_{22}$-alkyl, and $R_2$ is

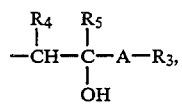

where $R_3$, $R_4$, $R_5$ and A are defined as in claim 1.

3. The liquid composition for use in an electrodeposition bath of claim 1, where the binder is a cationically depositable binder.

4. The liquid composition for use in an electrodeposition bath of claim 1, where the binder is a cationic amino-urethane resin.

5. The liquid composition for use in an electrodeposition bath of claim 1, where the binder is a cationic amine-modified epoxy resin.

6. A method for coating electrically conductive substrates comprising
   a) immersing the substrate in an aqueous electrodeposition bath which contains at least one cathodically depositable synthetic resin,
   b) connecting the substrate serving as a cathode in the electrodeposition bath,
   c) depositing a film on the substrate by application of a direct current,
   d) removing the substrate from the electrodeposition bath and
   e) stoving the deposited film to form a coating wherein the electrodeposition bath is filled with a liquid composition of claim 1.

7. A method for coating an electrically conductive substrate comprising
   a) immersing the substrate in an aqueous electrodeposition bath which contains at least one cathodically depositable synthetic resin,
   b) connecting the substrate serving as a cathode in the electrodeposition bath,
   c) depositing a film on the substrate by application of a direct current,
   d) removing the substrate from the electrodeposition bath and
   e) stoving the deposited film to form a coating, wherein the electrodeposition bath is filled with the electrodeposition liquid composition of claim 2.

8. The liquid composition of claim 1 wherein $R_1$ is $C_{10}$-$C_{15}$-alkyl.

* * * * *